INVENTOR
PETER WILSON

United States Patent Office 3,407,643
Patented Oct. 29, 1968

3,407,643
MEANS FOR SETTING INERTIAL NAVIGATION SYSTEMS
Peter Wilson, London, England, assignor to Elliott Brothers (London) Limited, London, England, a British company
Filed Oct. 12, 1965, Ser. No. 495,164
Claims priority, application Great Britain, Oct. 19, 1964, 42,614/64
7 Claims. (Cl. 73—1)

ABSTRACT OF THE DISCLOSURE

The inertial platform of an aircraft erected to approximate the heading of a runway is corrected incidental to aircraft takeoff. Inertially derived velocity signals indicative of velocity along the takeoff path on the runway and error velocity perpendicular to the takeoff path are integrated to respectively produce a signal indicative of a distance $s$ travelled along the runway and a lateral error distance $x$ due to error in the erected heading. The inertial platform heading is then corrected in accordance with $x/s$.

---

Figure 1:
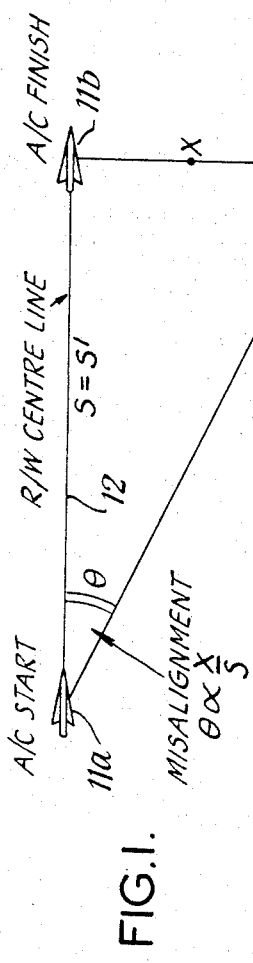

The invention relates to inertial navigation systems for aircraft and to the alignment in azimuth of such systems.

According to one aspect of the invention there is provided an apparatus capable of providing alignment in azimuth of an inertial navigation system, said apparatus being arranged to produce signals representative of measures of distance from inertially derived measures of velocity, along and normal to the known direction of a runway centre line, travelled by an aircraft carrying an inertial navigation system and the apparatus during a measured distance of take-off run substantially along the said centre line and said apparatus being arranged to produce from the signals representative of measured distances an error signal which can be utilised to align the inertial navigation system in azimuth.

The distance to be travelled along the runway may be a predetermined distance set into the apparatus, the distance actually travelled being measured inertially and equality of the distances being arranged to stop measurement of the distance normal to the runway centre.

Alternatively measurements of distance travelled along the runway and normal to the runway centre may be stopped under control of means responsive to take-off of the aircraft.

The apparatus may include integrator means to which signals representative of the inertially derived measures of velocity are arranged to be fed to produce the signals representative of the measured distances.

The signals representative of the inertially derived velocities may be derived from the two sine/co-sine resolvers arranged to be fed respectively with signals representative of northerly and easterly velocities derived from an inertial platform.

The integrator means may comprise a first integrator arranged to be fed with outputs from the sine/co-sine resolvers, such that its output is indicative of said measured distance along the runway, this output being fed together with further outputs from the sine/co-sine resolvers as inputs to a second integrator whose output is arranged to produce said error signal.

The output from the first integrator may be arranged to be fed to a comparator which is also arranged to be fed with a signal representative of a predetermined distance along the runway, the comparator being arranged to disconnect the connections between the sine/co-sine resolvers and the first and second integrators and also to disconnect the connections between the first and second integrators when a predetermined relationship exists between the two inputs to said comparator, e.g. when they are equal.

According to a further aspect of the invention a method of aligning in azimuth an inertial navigation system comprises inertially deriving measures of distance, along and normal to the known direction of a runway centre line, travelled by an aircraft carying the system during a measured distance of take-off run substantially along the centre line, and producing from the measured distances an error signal which is utilised to align the system in azimuth.

The distance to be travelled along the runway may be a predetermined distance, equality of this predetermined distance with the distance actually travelled by the aircraft being arranged to stop measurement of the distance normal to the runway centre.

Alternatively measurements of the distance travelled along the runway and of distance travelled normal to the runway centre may be stopped when the aircraft leaves the ground.

Figure 2:
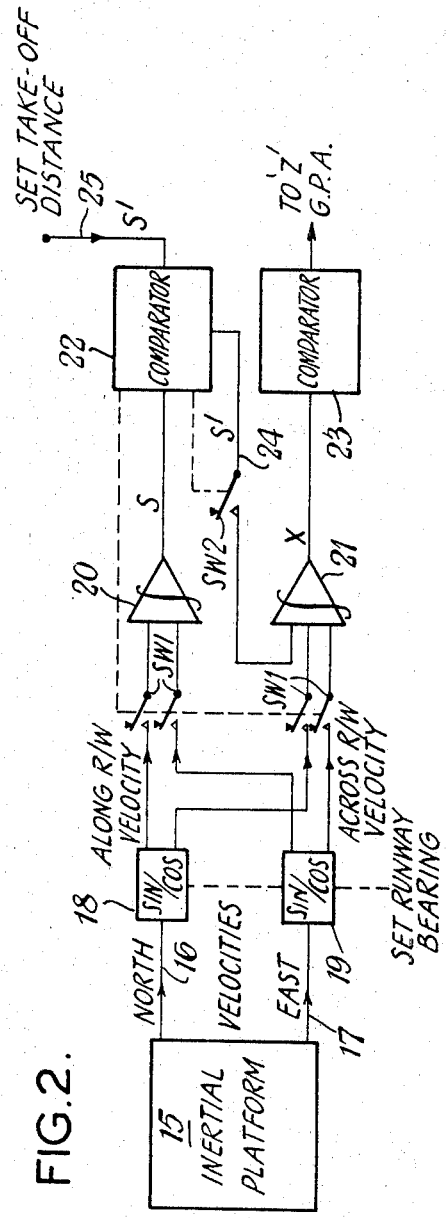

The foregoing and further features of the invention will become apparent from the following description of a preferred embodiment thereof with reference to the accompanying drawings, in which:

FIGURE 1 shows a diagrammatic representation of the theory associated with the invention, and FIGURE 2 shows a block schematic representation of a portion of an inertial navigation system for providing azimuth alignment of the system.

Referring firstly to FIGURE 1 there is shown an aircraft positioned at the start $11a$ and finish $11b$ of a take-off run along the centre line 12 of a runway, the direction of the runway being known. A predetermined distance $S'$ along the runway is set into the inertial navigation system in the aircraft. As the aircraft commences its take-off run at $11a$ the distance travelled $S$ along the centre line 12 of the runway is inertially measured until $S'=S$ when the aircraft arrives at point $11b$, a distance $X$ normal to the centre line 12 of the runway also being measured whilst the distance $S'$ is being measured.

It can be seen from FIGURE 1 that if the direction of the centre line 12 of the runway is known the angle $\theta$ between the centre line 12 of the runway and line 13 which runs to a point 14 which is the aircraft position computed by the system will be the error in azimuth of the system. It will be noted that the error in azimuth of the system $\theta$ is proportional to the distance $X$ divided by the distance $S'$.

Referring now to FIGURE 2 there is shown a block schematic representation of a system which utilises the concepts illustrated in FIGURE 1 to produce an electrical signal indicative of the error in azimuth alignment of the system.

The arrangement comprises an inertial platform 15 carrying accelerometers (not shown) arranged to determine respectively velocities of the aircraft in a direction north and east.

The outputs from the accelerometers determining velocities in the north and east directions respectively are fed along leads 16 and 17 to sine/co-sine resolvers, e.g. potentiometers, 18 and 19. Outputs from sine/co-sine resolvers 18 and 19 are fed via switches SW1 to integrators 20 and 21 such that the output of integrator 20 is a measure of distance S and the output of integrator 21 is a measure of distance X. The output of integrator 20 is fed to a comparator 22 and the output from integrator 21 is fed via a second comparator 23 to the azimuth gyroscope precession amplifier. The output of integrator 21 is arranged to be controlled by comparator 22 along a lead 24 including a switch SW2. Comparator 23 detects the instant at which the integrator 21 is discharged and terminates the precession signal.

The operation of the arrangement shown in FIGURE 2 will now be described with reference to FIGURES 1 and 2.

The inertial platform 15 is initially erected in the aircraft in the normal way and coarse alignment of the thereof is obtained by setting in the aircraft compass heading.

The surveyed Runway True bearing is set in to the sine/co-sine resolvers 18 and 19 so that inertial velocities fed thereto will be resolved about this bearing.

A distance slightly less than the calculated take-off distance for the particular aircraft is set into the comparator 22 via lead 25.

The aircraft is brought on to the runway on or close to the centre line 12 and is stopped. The system is electrically zeroed, i.e. accelerometer outputs returned to zero, and then released to allow operation thereof as the aircraft commences to move on its take-off run. The aircraft commences the take-off run and is aimed to be on or close to the centre line 12 when it reaches position 11b just prior to leaving the ground.

As the aircraft moves along the runway outputs are produced from the accelerometers on inertial platform 15, indicative of northerly and easterly velocities, which are fed along leads 16 and 17 to sine/co-sine resolvers 18 and 19 respectively. The outputs from the sine/cosine resolvers are fed via switches SW1, now closed under control of comparator 22 on commencement of the take-off run, to integrators 20 and 21.

The output of integrator 20, which is arranged to be indicative of distance along the runway by virtue of the inputs thereto, is fed to comparator 22. This input to comparator 22 from integrator 20 is compared therein with a signal indicative of the predetermined distance along the runway. When the comparator 22 detects equality between these two signals it causes switches SW1 to open and switch SW2 to close.

The output of integrator 20 is then arranged to be fed via comparator 22 and switch SW2 to integrator 21 so as to control the output thereof to comparator 23. The output from integrator 21, which is arranged to be indicative of the distance X by virtue of the inputs thereto, is arranged to control the output of comparator 23. The output of comparator 23 causes a constant rate signal to be fed to precess the azimuth gyroscope carried on the inertial platform 15. Hence the azimuth gyroscope is precessed for a time directly proportional to distance X and inversely proportional to distance S' so providing the required correction.

In a further embodiment of the invention the comparator 22 can be dispensed with, the switches SW1 and SW2 being in the form of oleo switches arranged to be in their "make" condition when the aircraft is on the ground and to be in their "break" condition when the aircraft leaves the ground. Alternatively the switches SW1 and SW2 could be controlled by means in turn controlled by one or more oleo switches. It will be realised that such a system would work in substantially the same manner as that described for FIGURE 2 except that no set distance S' has to be included.

The arrangement described with reference to FIGURE 2 has the advantage that wander or drift of the aircraft during the intermediate stage of the take-off run has no effect due to the fact that the required distances to be measured are derived from velocities rather than headings.

With the exceptions that the aircraft must pause momentarily close to the centre line of the runway at the initial take-off position and be close to the centre line of the runway, just prior to leaving the ground, there are no constraints on the aircraft or aircrew.

Knowledge of accurate runway direction is no problem as this information is already available at all major world airports and calculated take-off distance is a routine prerequisite for all civil and most military flights.

We claim:

1. Apparatus for correcting, incidental to takeoff, the inertially derived azimuth heading of an inertial platform carried by an aircraft, said inertial platform having signal output means indicative of the velocity of the aircraft, said apparatus comprising, in combination, means operable to develop a signal indicative of runway heading, resolver means receiving said signal indicative of runway heading and the velocity signal from said signal output means of the inertial platform for producing a first inertially derived signal indicative of aircraft velocity along the runway and a second inertially derived signal indicative of velocity lateral to the runway due to error in heading of said inertial platform, integrator means receiving said first and second inertially derived signals and respectively having an output proportional to distance $s$ travelled along the runway and an output proportional to the lateral error distance $x$ perpendicular to the runway, and means for correcting the heading of said inertial platform according to $x/s$.

2. An apparatus as claimed in claim 1 wherein said resolver means comprises two sine/co-sine resolvers arranged to be fed respectively with signals representative of northerly and easterly velocities derived from the inertial platform.

3. Apparatus as claimed in claim 2 wherein said integrator means comprises a first integrator arranged to be fed with outputs from the sine/co-sine resolvers, such that its output is indicative of said measured distance along the runway, and a second integrator arranged to be fed with further outputs from the sine/co-sine resolver and with the output of said first integrator.

4. Apparatus as claimed in claim 3 wherein the output from the first integrator is arranged to be fed to a comparator which is also arranged to be fed with a signal representative of a predetermined distance along the runway, said comparator being arranged to disconnect the connections between the sine/co-sine resolvers and the first and second integrators and also to disconnect the connection between the first and second integrators when a predetermined relationship exists between the two inputs to said comparator.

5. The method of aligning in azimuth an inertial navigation system carried by an aircraft comprising the steps of:

setting the system to measure a distance travelled along a known direction of a runway center line, moving the aircraft along said center line, inertially deriving measurements of the distance along and normal to the center line, the distance measured normal to the center line being indicative of the error in the original setting.

6. A method as claimed in claim 5 wherein the distance travelled along the runway is a predetermined distance.

7. A method as claimed in claim 5 wherein measurements of the distance travelled along the runway and of distance travelled normal to the runway centre are stopped when the aircraft leaves the ground.

References Cited

UNITED STATES PATENTS 3,107,514    10/1963    Walker _____ 73—178 XR

S. CLEMENT SWISHER, *Acting Primary Examiner.*